US000001389H

United States Statutory Invention Registration [19]

[11] Reg. Number: H1389

[43] Published: Jan. 3, 1995

Weldon et al.

[54] IRON BACKED, ROUND BORE, AUGMENTED ELECTROMAGNETIC ACCELERATOR AS AN INJECTOR

[75] Inventors: William F. Weldon; Siddharth Pratap, both of Austin, Tex.

[73] Assignee: The United States of America as represented by the Secretary of the Army, Washington, D.C.

[21] Appl. No.: 49,279

[22] Filed: Apr. 19, 1993

[51] Int. Cl.[6] ..... F41B 6/00

[52] U.S. Cl. ..... 89/8

*Primary Examiner*—Stephen C. Bentley

*Attorney, Agent, or Firm*—Anthony T. Lane; Edward Goldberg; Michael Sachs

[57] ABSTRACT

An augmented electromagnetic accelerator apparatus which imparts an initial velocity to a projectile by use of enhanced inductance gradients and allows for the use of cylindrical projectiles by the use of a round bore, using a parallel gun rail geometry The enhanced inductance gradients are achieved by the use of an extra turn around the gun rails and enclosing the rail and the said augmented turn in laminated iron. The augmented accelerator has crossovers at the two ends (breech and muzzle end) which have minimum influences over the elctromagnetics in the bore of the accelerator.

20 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

IRON BACKED, ROUND BORE, AUGMENTED ELECTROMAGNETIC ACCELERATOR AS AN INJECTOR

The invention described herein may be manufactured, used and licensed by or for the Government for Governmental purpose without payment to us of any royalties thereon.

BACKGROUND ON THE INVENTION

1. Field of Invention

This invention relates generally to the field of electromagnetic guns. This technology allows guns to be built which can launch projectiles at much higher velocities than conventional chemical-explosive guns.

2. Background of the Invention

One of the problems encountered in accelerating macro projectiles through electromagnetic guns is that the rails get damaged at the breech of the gun where the projectile starts from rest. This damage to the rails can be reduced considerably if the projectile is inserted into the breech of the gun with an initial velocity.

Gas injectors and other conventional mechanisms have been used to impart the initial velocity to the projectile; however, these mechanisms require a separate power source.

Since a power supply is used to energize an electromagnetic (EM) gun, it would be economical and practical to use another short section of the EM gun, energized by the same source as the main gun, to impart the initial velocity to the projectile.

Now the EM gun which accelerates the projectile to its final velocity is usually considerably long and made of costlier material; since it has to withstand severe duty conditions. This makes the EM gun difficult and costly to replace in case of damage. The injector described herein correspondingly should be easy and economical to replace.

This invention allows for the use of an injector which provides for an initial velocity to be imparted to a projectile and which is easily replaceable and economical.

SUMMARY OF INVENTION

1. It is an object of this invention to provide an augmented accelerator that can be easily removed and replaced in the bore of the stack of iron lamination.

2. It is an object of this invention to enhance the inductance gradient of the augmented EM accelerator.

3. It is an object of this invention to provide an injector which accelerates cylindrical projectiles using a parallel rail geometry.

4. It is an object of this invention to provide an accelerator which has crossovers at two ends which have minimum interference and the electromagnetics in the bore of the accelerator.

5. It is a further object of this invention to provide an injector to serve as the "switching" in compulsator driven EM gun systems ("hot rail" concept).

DETAILED DESCRIPTION OF THE PREFERRED EMBODIMENT

Figure 1:
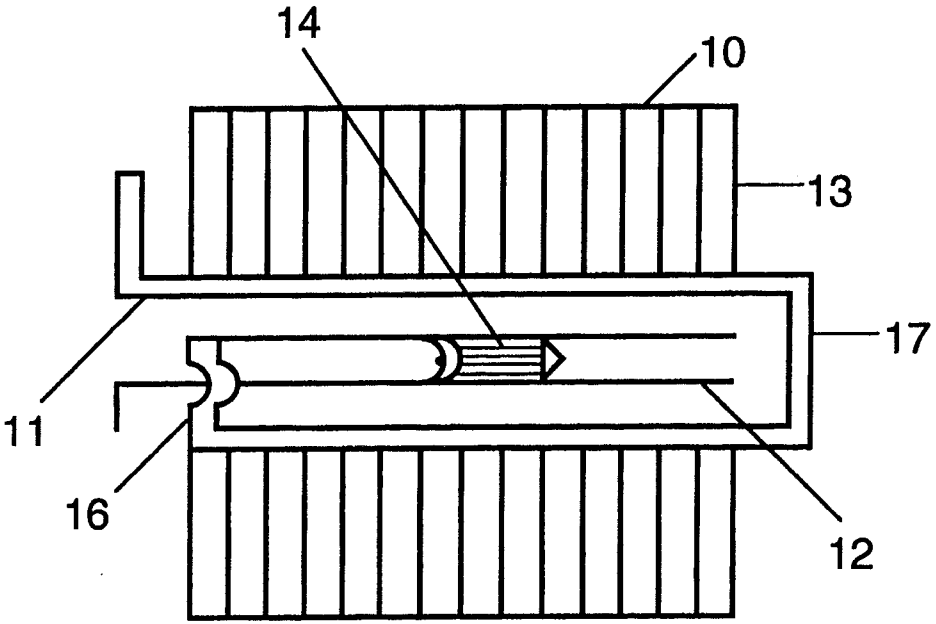
FIG. 1 is a schematic of the accelerator, referred herein as the injector.

Turning now to FIG. 1, it shows the iron backed, round bore, electromagnetic accelerator, referred to as the injector 10 hereafter.

The injector 10 as described here is a high-inductance gradient EM gun. The high inductance gradient is obtained by two independent techniques, one of which is introducing an extra turn 11 around the rails 12 and augmenting turn 11 in laminated iron 13. Both of these techniques enhance the accelerating magnetic field. The injector 10 therefore will impact a much higher velocity to a projectile for the same current than a simple parallel EM gun. The injector 10 is designed to have a round bore to accelerate cylindrical projectiles 14 which makes it attractive for defense applications.

In order to reduce damage to the rails 12 at the breech, the injector 10 is operated at relatively low current levels. However, in order to accelerate the projectile 14 to the required velocity, use is made of the high inductance gradient provided by the augmenting turn 11. The iron 13 contributes towards a higher inductance gradient, also, but to a lesser extent of saturation in the iron 13. The iron 13, however, provides a high inductance gradient at the start of the accelerating current pulse in the injector 10 when the current is low and therefore serves a useful purpose in reducing damage to the rails 12 at the breech. The ion laminations 13 provide structural stiffness to the rails 12 and the augmenting turn 11.

Figure 2A:
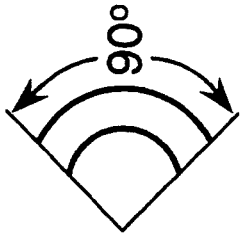
FIG. 2A is an view of FIG. 2.
Figure 2:
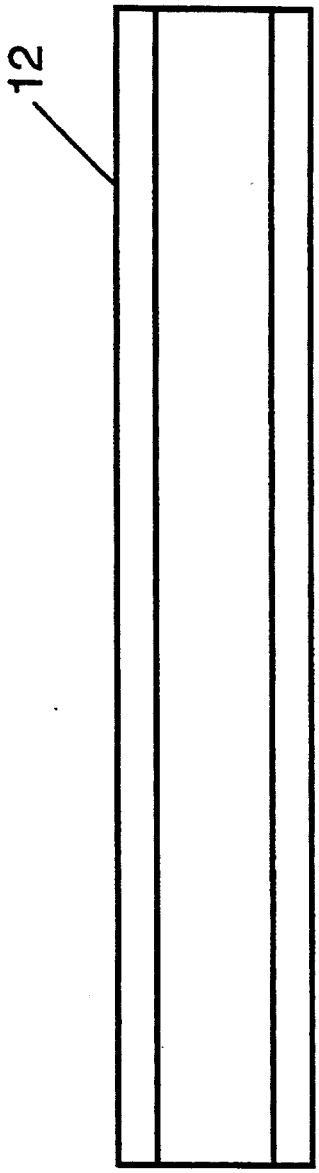
FIG. 2 is a schematic of the rails.

FIG. 2 depicts the rails 12 which are fabricated from solid copper rods. To make the rails 12, the required outer and inner diameters are first machined and then four axial slits are made at 90 degree intervals along the circumference to obtain four segments, of which two are used as rails 12.

Figure 3A:
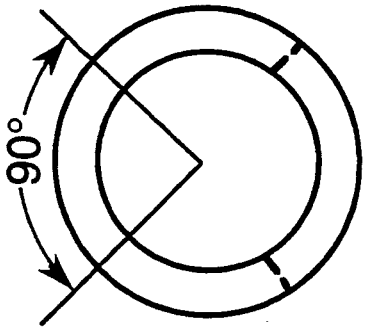
FIG. 3A is an end view of FIG. 3.
Figure 3:
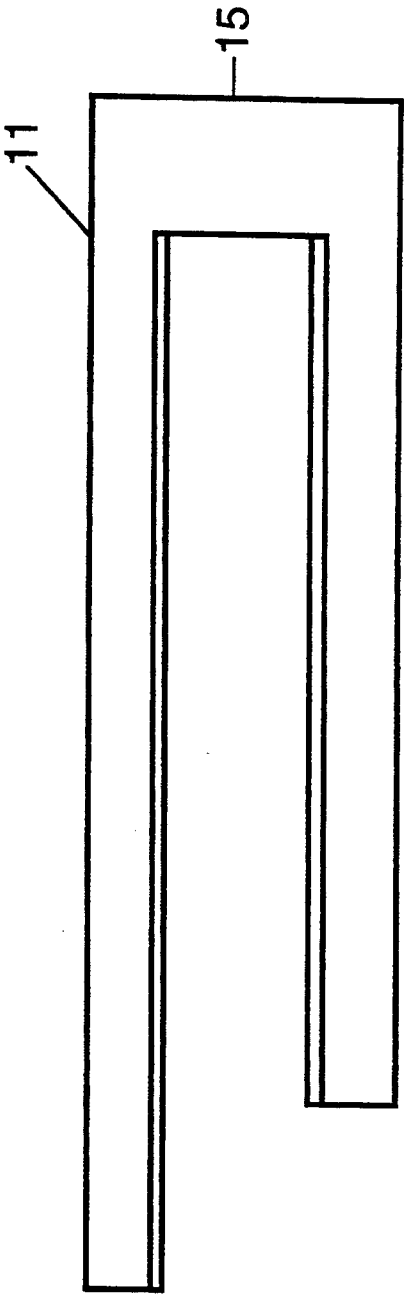
FIG. 3 is a schematic of the augmenting turn.

FIG. 3 depicts the augmenting turn 11 which is made similar to the rails 12. The main difference is that for the augmenting turn 11, the axial slits are not made over the entire length of the solid copper rod, but only up to a short distance from one end. The resulting ring which forms is the cross over 15.

Figure 4:
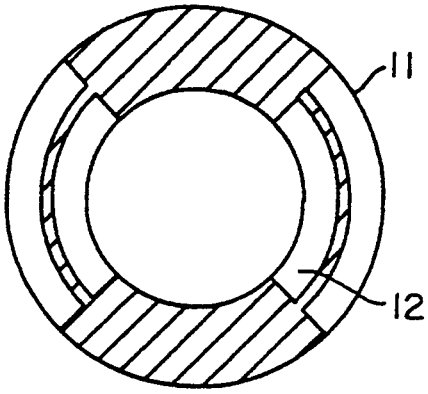
FIG. 4 is a cross section of the injector at its central portion.
Figure 5:
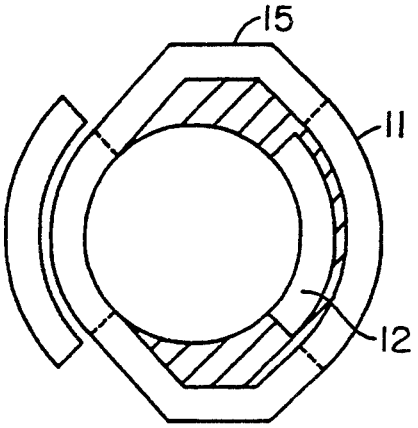
FIG. 5 is a cross section of the injector at its breech end.
Figure 6:
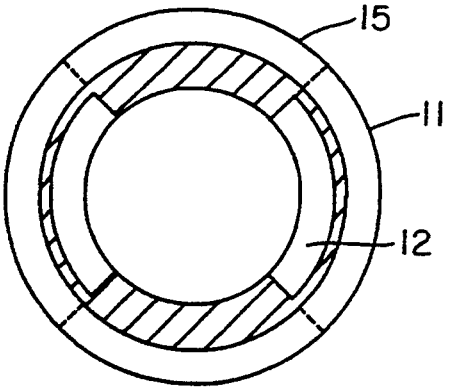
FIG. 6 is a cross section of the injector at its muzzle end.

The cross-section of the injector 10 at the central portion, breech end 16 and muzzle end 17 are shown in FIG. 4, 5, and 6 respectively.

Figure 7:
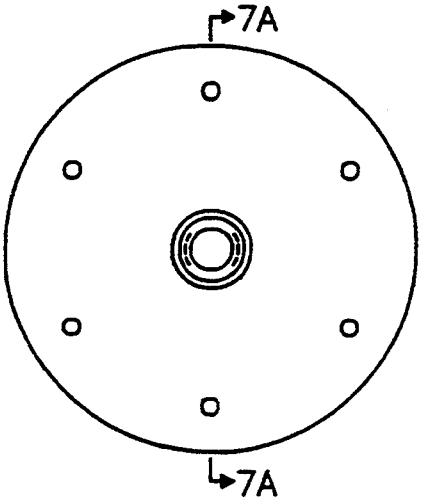
FIG. 7 is schematic of the complete assembly of the injector.
Figure 7A:
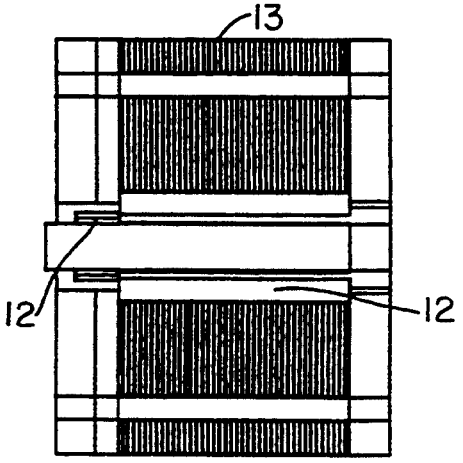
FIG. 7A is a section view of FIG. 7 along section lines 7A—7A thereon.

The assembly is completed as shown at FIG. 7 around a mandrel, after which it can be inserted into the bore of the lamination stack. FIG. 7A shows a sectional view of FIG. 7 along the section lines 7A—7A thereon. This design and assembly technique facilitates the replacement of the rail 12 and augmenting turn 11 from the bore of the lamination stack 13.

Figure 8:
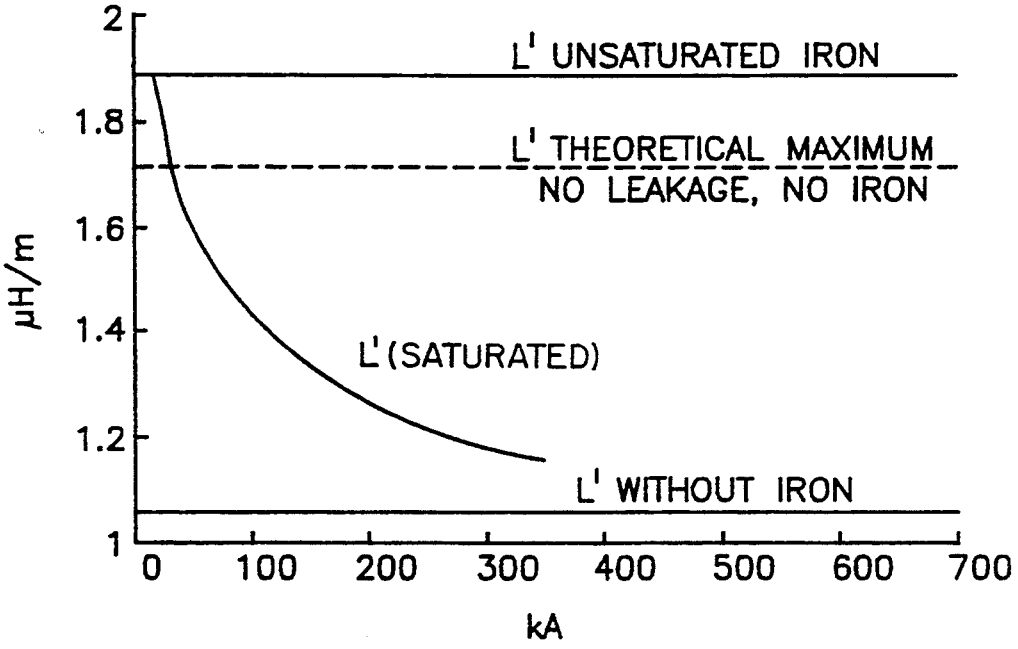
FIG. 8 is a graph showing the variation of the inductance gradient with current through the rails.

FIG. 8 depicts the variation of the inductance gradient as a function of current through the rails 12. Dynamic tests on the injector 10 yielded a velocity of 320 m/s with a 300 kA peak and 1.2 ms current pulse over 15.24 cm.

The injector 10 described above serves to provide the switching function in compulsator driven EM gun systems. A compulsator is essentially a low impedance single phase alternator which produces more or less sinusoidal current pulses in time. The performance of the EM gun is sensitive to the phase angle (with respect to the open circuit voltage) at which the current pulse is initiated. If a switch is used to initiate the current pulse, then the current through the EM gun is limited by the current carrying capability of the switch. Instead the rails 12 of the injector can be directly connected to the terminals of the compulsator ("hot rail" concept) and the injector can be connected to the compulsator through a switch. The switch now has to carry a much lower current since it carries the current required of the injector. With this scheme, the armature of the projectile 14 initiates the current pulse in the EM gun as it leaves the injector. Tests on the device indicate a jitter of only 60 microseconds which is sufficiently accurate to switch a compulsator driven EM gun. The above described augmented injector being a high inductance gradient EM gun is better suited as a load for a compulsator because the compulsator can more easily produce higher voltages at lower current levels.

Thus, it is apparent that in accordance with the present invention, a functional design that fully satisfies the objectives, aims and advantages is set forth above. While the invention has been described in conjunction with a specific embodiment, it is evident that many alternatives, modifications and variations will become apparent to those skilled in the art in light of the foregoing description. Accordingly, it is intended that the present invention embrace all such alternatives, modifications, and variations as fall within the spirit and broad scope of the appended claims.

What is claimed is:

1. An injector system for imparting an initial velocity to a projectile as it enters the breech of an electromagnetic gun, having crossovers at the breech and muzzle ends which have minimum influences over the electromagnetics in the bore, comprising means to provide enhanced inductance gradients;

means to accelerate cylindrical projectiles.

2. The injector system of claim 1 wherein the means to provide enhanced inductance gradients are by introducing an extra turn around the gun rails and enclosing the rail and said augmented turn in laminated iron.

3. The injector system of claim 1 wherein the means to accelerate cylindrical projectiles is caused by having a round bore, using a parallel gun rail geometry.

4. The injector system of claim 1 wherein the said augmented turn as well as the gun rails are made of solid copper which is machined.

5. The injector system of claim 1 wherein the said system serves as the injector and switching device in a compulsator driven EM gun system.

6. An augmented electromagnetic accelerator apparatus for impacting an initial velocity to a projectile having crossovers at the breech and muzzle ends which have minimum influences over the electromagnetics in the bore, comprising means to provide enhanced inductance gradients;

means to accelerate cylindrical projectiles.

7. The augmented electromagnetic accelerator apparatus of claim 6 wherein the means to provide enhanced inductance gradients are by introducing an extra turn around the rails and enclosing the rails and said augmented turn in laminated iron.

8. The augmented electromagnetic accelerator apparatus of claim 6 wherein the means to accelerate cylindrical projectiles is caused by having a round bore, using a parallel rail geometry.

9. The augmented electromagnetic accelerator apparatus of claim 6 wherein the said augmented turn as well as the gun rails are made of solid copper which is machined.

10. The augmented electromagnetic accelerator apparatus of claim 6 wherein the said apparatus serves as the injector and switching apparatus in a compulsator driven EM gun system.

11. An injector apparatus for imparting an initial velocity to a projectile as it enters the breech of an electromagnetic gun, having crossovers at the breech and muzzle ends which have no influences over the electromagnetics in the bore, comprising means to provide enhanced inductance gradients;

means to accelerate cylindrical projectiles.

12. The injector apparatus of claim wherein the means to provide enhanced inductance gradients are by introducing an extra turn around the gun rails and enclosing the rail and said augmented turn in laminated iron.

13. The injector apparatus of claim 11 wherein the means to accelerate cylindrical projectiles is caused by having a round bore, using a parallel gun rail geometry.

14. The injector apparatus of claim 11 wherein the said augmented turn as well as the gun rails are made of solid copper which is machined.

15. The injector apparatus of claim 11 wherein the said apparatus serves as the injector and switching device in a compulsator driven EM gun system.

16. An augmented electromagnetic accelerator apparatus for impacting an initial velocity to a projectile, having crossovers at the breech and muzzle ends which have the minimum infuences over the electromagnetics in the bore, comprising means to provide enhanced inductance gradients;

means to accelerate cylindrical projectiles.

17. The augmented electromagnetic accelerator apparatus of claim 16 wherein the means to provide enhanced inductance gradients are by introducing an extra turn around the rails and enclosing the rails and said augmented turn in laminated iron.

18. The augmented electromagnetic accelerator apparatus of claim 16 wherein the means to accelerate cylindrical projectiles is caused by having a round bore, using a parallel rail geometry.

19. The augmented electromagnetic accelerator apparatus of claim 16 wherein the said augmented turn as well as the gun rails are made of solid copper which is machined.

20. The augmented electromagnetic accelerator apparatus of claim 16 wherein the said apparatus serves as the injector and switching apparatus in a compulsator driven EM gun system.

* * * * *